May 7, 1935.
I. HECHENBLEIKNER
2,000,444
METHOD OF AND APPARATUS FOR BRINGING A LIQUID
AND A GAS INTO INTIMATE CONTACT OR MIXTURE
Filed June 24, 1932
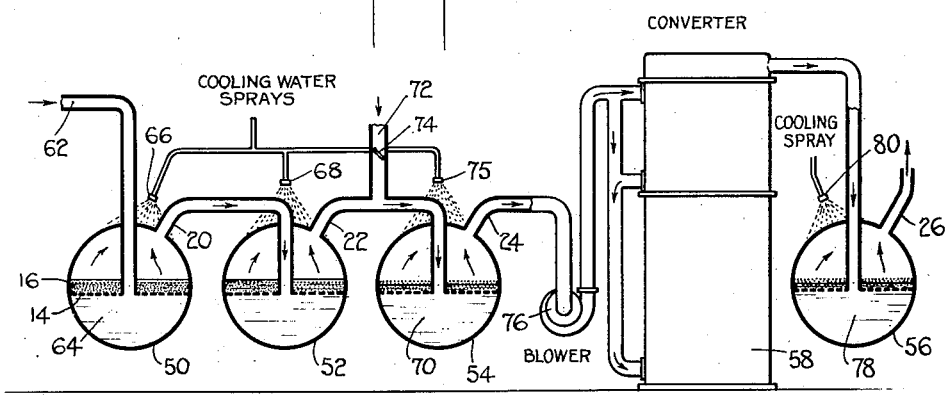
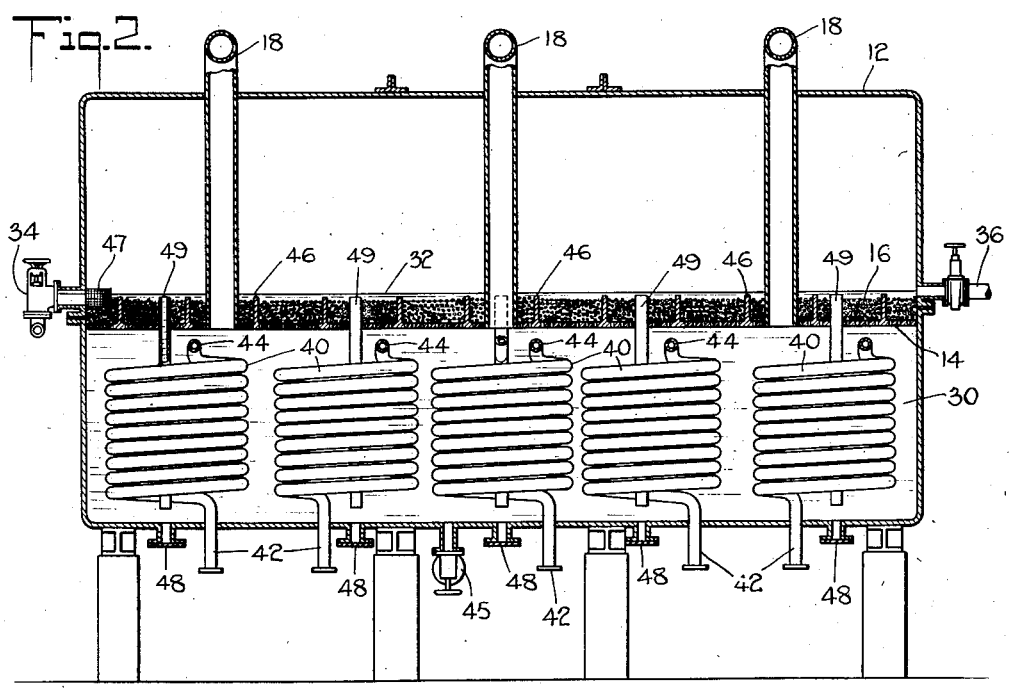
INVENTOR
Ingenuin Hechenbleikner
BY
*James & Franklin*
ATTORNEYS Patented May 7, 1935

2,000,444

UNITED STATES PATENT OFFICE 2,000,444

METHOD OF AND APPARATUS FOR BRINGING A LIQUID AND A GAS INTO INTIMATE CONTACT OR MIXTURE

Ingenuin Hechenbleikner, Charlotte, N. C., assignor to Chemical Construction Corporation, Charlotte, N. C., a corporation of Delaware Application June 24, 1932, Serial No. 619,054

13 Claims. (Cl. 261—96)

This invention relates to the bringing of a liquid and a gas into intimate contact or mixture, and more particularly to a method and apparatus for so doing with a view to providing efficient scrubbing, drying, absorption, condensation, and the like in industrial chemical processes.

The primary object of the invention is provision of a new and improved method and apparatus for promoting intimate contact between a gas and a liquid, particularly where an efficient scrubbing action is desired. A second object is the provision of such a method and apparatus which will be of low power consumption, effective in removing the last traces of undesirable or other constituents from the gas to be purified, susceptible of ready temperature control, and self-cleaning in operation when the removal of dirt or dust from a gas is necessary. A still further object is the provision of a system for the accomplishment of the above purposes which will have a wide range of utility in industrial operations, will be simple and efficient in operation, and of low installation and maintenance cost.

With these and other objects in view, the invention comprises the provision of a gas and liquid contact apparatus having packing means of a movable nature such as a perforated diaphragm covered with a relatively shallow layer of gravel or pebbles of quartz rock or other material not attacked by the gas or liquid, this layer of gravel being at least partially immersed in the liquid and means being provided for the passage of the gas upwardly through the liquid and the gravel. By this method of operation, it is possible to adjust such factors as the buoyancy of the gravel, the gas velocity and the liquid level in such a manner as to cause a controlled agitation, shaking or seething of the gravel or pebbles, whereby an unusually fine subdivision and scrubbing of the gas bubbles is obtained while the pebbles are continuously cleansed by attrition. The agitation of the gravel causes a constant shifting of the interstices and a constant rubbing by the pebbles, with a sort of washboard action. The agitation of the gravel may, if desired, be kept so slight as to be almost imperceptible to the eye, the entire operation being substantially quiescent, with a complete absence of turbulence or upward spray of liquid, and yet this constant vibration of the gravel is sufficient not only for efficient contact and mixture, but also to cause it to shake off and rid itself of any dust or dirt trapped therebetween. The dust apparently accretes into larger particles which readily settle. When removing oil mist the minute particles similarly seem to be coalesced into larger and readily separable globules.

A further and more specific object of the present invention resides in the provision of a method and means for controlling the amount of agitation of the gravel, and this I have found may be done by interrelating a number of factors, such as the buoyancy of the pebbles, dependent upon the relative specific gravities of the pebbles and the liquid in which they are immersed, the gas velocity, and the liquid level relative to the top of the bed of gravel. It is evident that the greater the specific gravity of the liquid relative to that of the pebbles, the more buoyant or lively the pebbles will become. This in turn may be counteracted, however, by depressing the liquid level below the top of the gravel bed, or, in other words, by loading the submerged gravel with the deadweight of additional gravel spread to a height above the liquid.

To the accomplishment of the foregoing and such other objects as may hereinafter appear, my invention consists in the method and apparatus elements and their relation one to the other, as hereinafter are more particularly described in the specification and sought to be defined in the claims. The specification is accompanied by a drawing, in which:

Fig. 1 is a schematic flow diagram illustrating a number of different applications of my invention; and Fig. 2 is a section taken in elevation through one form of apparatus embodying features of my invention.

Referring now to the drawing, and particularly to Fig. 2 thereof, my improved apparatus comprises an enclosed chamber, preferably a horizontally disposed cylinder or drum 12, having a perforated partition or diaphragm 14 extending thereacross, say, approximately diametrically as shown, in order to obtain a maximum area. The perforated diaphragm 14 supports a layer of gravel 16 which is relatively shallow compared to the area of the layer or bed. The gas is supplied through one or more inlet pipes 18 which may enter through the top of the drum 12, as shown, and which extend downwardly through diaphragm 14 in order to discharge the gas at a point below the diaphragm. The gas is afterward discharged through one or more outlets connected to the upper portion of the drum, these outlets not being visible in Fig. 2 because of the direction in which the section is being viewed.

but the nature of the outlets in question will readily be understood from an inspection of Fig. 1 showing outlets 20, 22, 24, and 26, any of which are similar to the kind of outlets utilizable in connection with the drum 12 of Fig. 2. The drum contains a solid body of liquid 30 the upper level 32 of which is properly adjusted or determined to cover at least a portion of the gravel bed 16, or, as in the present case, to entirely cover the same. The liquid level 32 may be and preferably is determined by an adjustable overflow valve 34, so that a single piece of apparatus may, if desired, have its liquid level varied in accordance with the purpose to which it is to be put. The perforations in the diaphragm are made as large as possible relative to the size of the pebbles or gravel, no attempt being made to in any way slow up or impede the gas flow during its passage through the diaphragm itself. On the contrary, the diaphragm is made as fully perforate as possible, its only function being to support the bed of gravel.

In operation, it will be readily appreciated that the gas entering through inlets 18 is discharged just beneath the diaphragm, and flows upwardly through the gravel bed 16. Although I may refer to the gravel as comprising pebbles or beads, it is to be clearly understood that the discrete elements thereof are not round or specially ground in any way, but rather are rough and in the natural form which quartz rock, for example, assumes when cracked or broken and subsequently selected for uniform size by screening. The bed of gravel breaks the gas up into exceedingly small bubbles, and the individual tiny bubbles are greatly distorted and elongated during their retarded passage through the various spaces and interstices in the gravel. The bubbles are forced to tortuously bend and wind through the maze presented by the bed of gravel, so that the gas bubbles are operated upon by a sort of washboard action which causes the most intimate possible type of contact and mixture of the gas and liquid.

The actual operation in practice is extraordinarily efficient, and some of the unexpected effectiveness is undoubtedly due to the fact that the bed of gravel is itself agitated and appears to be in a constant state of seething motion or shimmy, and, when observed through sight glasses provided in the drum, the gravel bed has all the appearance of being alive. The gas escaping from the surface is a finely divided gas of minute bubbles which, although sufficiently active to cause the desired shaking or agitation of the gravel, is not at all turbulent, but rather is quiescent. The bubbles pass through the free liquid above the gravel bed without throwing spray or jets of liquid up into the gas space, such as occurs when large bubbles are passed rapidly upwardly through a body of liquid.

I have carefully investigated the phenomenon involved, and have determined that the efficiency of the process depends upon this unusual action of the layer of gravel, and that the action obtained may be controlled with a view to producing optimum results. More particularly, I have found that the shaking or vibratory action of the gravel is dependent upon a number of factors, particularly the buoyant force exerted upon the gravel by the liquid, and the pressure or velocity of the gas flowing upwardly through the gravel. The buoyant force on the gravel depends upon the specific gravity of the solid matter in its relation to the specific gravity of the liquid, and may differ very markedly, for example, when the liquid is simply water in contrast with a liquid such as concentrated sulphuric acid. I have further found that the freedom of movement or liveliness of the gravel may be controlled, if desired, by varying the liquid level. When the liquid level is kept entirely above the gravel bed, as shown in Fig. 2, the maximum buoyant force is exerted on the gravel and the greatest freedom of movement results. If, however, the gravel is piled higher to a point above the liquid level, or, conversely, if the amount of liquid is diminished to a point below the top of the gravel bed, the deadweight of the exposed gravel is applied directly upon the submerged gravel and serves to deaden or decrease the liveliness of the gravel. In other words, there are at least four factors involved: the specific gravity of the pebbles, the specific gravity of the liquid, the gas velocity, and the liquid level; and these factors may be properly interrelated to obtain the desired agitation, shaking, or seething of the gravel, all without causing turbulence or spray of liquid upwardly into the gas space in the chamber.

My experiments indicate that the fine subdivision of the gas bubbles is important, and that the washboard action on the bubbles is also important; but in addition to these things the seething movement of the gravel in the absorbing or scrubbing liquid is of perhaps even greater importance for the reason that the agitation of the gravel causes a continual change in the shape, size, and nature of the spaces and interstices, and a continual mixing of the liquid surrounding the pebbles, thereby forcing new and unsaturated elements of the liquid into contact with the gas bubbles by physically breaking up and continually removing the saturated or old film of liquid from the surface of the individual gas bubbles. I believe that it is this continual agitation, mixing, replacement, and re-exposure of new liquid to the surface of the bubbles, together with the continual grinding, breaking up, and distortion of the bubbles themselves, all in contrast with simply permitting a saturated condition or film to grow between the bubble itself and the surrounding liquid, that results in the extraordinarily and unexpectedly high efficiency of this system.

Another important advantage of the vibratory or seething movement of the gravel before referred to, arises particularly when the apparatus is used to remove dust or dirt from a gas, or when the apparatus incidentally is compelled to operate upon such a dust or dirt bearing gas, for in such case I find that the gravel is self-cleaning in operation. The continual agitation or shaking of the gravel causes the dust or dirt which is trapped therein to be ground or shaken free from the gravel and precipitated downwardly. As was before explained, the diaphragm 14 is made as largely perforate as possible, and the downwardly precipitated dust or dirt readily passes through the diaphragm and falls to the very bottom of the drum where it is entirely out of the way of the normal path of gas circulation. It is largely for this reason that it is preferable to discharge the gas at a point just below the diaphragm, as shown, because then the normal upward path taken by the gas in no way disturbs the residue collected in the bottom of the drum. At appropriate intervals this residue may be removed and cleaned out of the drum in any known manner, the gravel itself, however, remaining unfouled and unclogged by such dirt.

It will be readily appreciated that the system shown operates with marked efficiency as regards power consumption. The gas is pumped upwardly through only some six inches of liquid and gravel, and meanwhile is spread over a large area of gravel so that the gas resistance is low and very little power is needed to circulate the gas. The liquid in many cases need not be circulated at all, but if the liquid is circulated as, for example, through the inlet pipe 36 and the overflow discharge valve 34, the difference in level or head is exceedingly slight and therefore necessitates but little power consumption. The apparatus of the present invention is well suited for the application of temperature control. If desired, the liquid in the drum may be passed by way of outlet 34 and inlet 36 through external heating and cooling coils, but an even more efficient arrangement is made possible by reason of the large space left free beneath the diaphragm 14 for cooling or heating coils such as the coils 40 in Figure 2.

These coils may consist of a single bank of piping, as is indicated in the drawing, or may consist of double or triple banks or coils of piping arranged concentrically one within the other. Connections may be made to the coils through inlets 42 located preferably at the bottom of the drum, and outlets 44 which may, for example, extend through the side of the drum in a manner not shown in the drawing.

The materials used in constructing the apparatus depend wholly upon the uses to which the apparatus is to be put. For example, in dealing with sulphuric acid the drum may be lead lined and the coils made of lead piping, while diaphragm 14 may be made of hard lead, etc., whereas if dealing with highly concentrated or fuming sulphuric acid, the parts may, if desired, be made of cast iron. Similar variations in material will be evident to those skilled in the art.

The gravel may, for example, be made of quartz rock, and in such case will be suited for use with most acids and nearly all industrial processes. However, it is not essential to use quartz, for any ceramic material not attacked by the gas or liquid involved may also be employed. For example, when the process involves oil, as for fractional condensation, pebbles of ordinary vitrified clay may be used.

Additional details which may be pointed out at this time are the preferable use of small upright partitions or ribs 46 which serve to strengthen and rigidify the diaphragm 14, and which incidentally help fix the location and distribution of the gravel; the preferable use of a sieve or strainer 47 at the outlet 34 in order to prevent any discharge of the gravel or solid matter through the outlet; the provision of inlets 48 through which air may be blown in certain rare cases when the liquid used may prove unadapted for natural slow circulation; and the provision of vertical pipes 49 which extend upwardly through the diaphragm and gravel bed, and which help facilitate circulation of the body of liquid when compressed air is used, as aforesaid. The lower ends of pipes 49 are preferably spaced from the inlets 48, as shown, in order to aid natural circulation even when no compressed air is employed. The openings 48 also facilitate flushing and removal of accumulated dirt or sediment from the bottom of the drum. There is also provided a valved drain 45 for completely draining the drum and which also may be used for the admission of liquid when the liquid is circulated through external apparatus, this connection then being used in lieu of the valved inlet 36 previously referred to.

Some of the uses of my invention may be illustrated in connection with the contact process for manufacturing sulphuric acid. Thus, referring to Fig. 1, four drums are illustrated in connection with a sulphuric acid plant: the drum 50 being a water scrubber; the drum 52 being a second scrubber which may use water or dilute acid; the drum 54 being a dryer; and the drum 56 being an absorption drum following the converter 58. The first drum 50 is used to scrub the $SO_2$ gases whatever be their source, said $SO_2$ gases entering through an inlet pipe 62 and being discharged into a body of water 64 below the diaphragm 14 and gravel bed 16. The scrubbed gases then flow out of the outlet 20 connected to the upper portion of drum 50, and are led directly into the next adjacent drum 52. The water scrubbing action in drum 50 serves to remove dust and dirt, condense some water vapor, and remove some of the volatile hydrocarbons if any are present. If the source of $SO_2$ gas is from a sulphur furnace, the removal of dust and dirt will be of primary importance, whereas in the case of a sludge conversion plant the removal of moisture and volatile hydrocarbons may be highly important. The removed dust or dirt settles to the bottom of the drum, as was explained in connection with Fig. 2. The removed hydrocarbons float on top of the body of water as a layer of oil which is continually drained through an overflow valve corresponding to the valve 34 in Fig. 2. No circulation of the water content is needed, for the liquid tends to increase due to the removal of moisture or/and oil from the gases passing through the drum. The drum is cooled, and, in lieu of the internal coils 40 shown in Fig. 2, a simple external spray such as the spray 66 may be employed. It should be noted that in this case the liquid level is above the level of the gravel. This is desirable because water has a specific gravity of only one, while the specific gravity of quartz rock gravel is two or more; and I find that under these circumstances the full buoyant effect of the water on the gravel is highly desirable in order to obtain the live motion or seething effect which I have already described.

The drum 52 is simply a second scrubber which may, if desired, contain water, but which more preferably contains dilute sulphuric acid. The scrubber 52 serves to further remove hydrocarbons and water vapor from the $SO_2$ gas, and for this purpose the drum may be kept at even a lower temperature than the drum 50. Here again the drum is shown as cooled by an external spray 68. The $SO_2$ gas leaving the scrubber 52 through outlet 22 is led directly into a dryer 54. This dryer contains a body 70 of concentrated sulphuric acid, say 98% strength, and serves to efficiently dehydrate the scrubbed gas. If secondary air is to be added to the $SO_2$ gas before oxidation to $SO_3$ in the converter 58, this secondary air is preferably added ahead of dryer 54, as through the inlet pipe 72 under the control of an appropriate damper 74. In this manner the secondary air supply as well as the $SO_2$ gas is thoroughly and completely dehydrated by the dryer 54. It should be noted that the level of the acid in drum 70 is preferably kept below the top of the layer of gravel. This is so because the specific gravity of the concentrated sulphuric acid is very much higher than that of water and exerts a much higher buoyant force on the gravel. I have found that with such a body of concentrated sulphuric acid the gravel may become too lively or too free in movement, and in order to deaden or retard the resulting agitation or shaking of the pebbles, the liquid level may be lowered so as to provide an exposed or elevated layer of gravel which rests and acts as a dead-weight upon the submerged gravel. A water spray head 75 may be provided for cooling the drum, as may be found necessary.

The dried gas mixture is then circulated, as by means of a blower 76, through the converter 58 which may be of the automatically gas cooled catalytic type. The resulting catalytic conversion oxidizes the $SO_2$ gas to the sulphur trioxide gas $SO_3$, and this sulphuric acid anhydride is next absorbed in sulphuric acid in the drum 56.

The drum 56 is another unit generally similar to those already described, and contains a body of sulphuric acid 78. For efficient absorption this acid is also preferably of 98% strength. It is therefore desirable in this case also to keep the liquid level below the level of the top of the gravel bed, as is shown in the drawing and as was mentioned in connection with the dryer 54. The drum 56 may be cooled by a water spray 80 or other appropriate cooling means. Residual gas is discharged through the outlet 26.

For use in sulphuric acid manufacture, as above outlined, I find that rock quartz is eminently suitable and that the quarter-inch size is preferable, that is, the pebbles are selected so as to just pass through one-quarter-inch mesh screen. The holes in the diaphragm are made as large as will properly support this size of gravel. The bed is preferably of the order of six inches in thickness, while the area of the bed depends upon the quantity of gas to be handled. I have determined that a rough guide to the preferable area of gravel bed is to use six square feet of pebble surface for each ton of sulphuric acid produced per twenty-four hour day. The units may conveniently be and preferably are made all alike, whether used for scrubbing or drying or absorption, as aforesaid. The operation of these units is highly efficient, a complete removal of moisture and other impurities from the gas being obtained.

While the invention has been specifically illustrated in connection with the cleaning and drying of $SO_2$ gas, it is to be understood that the process and apparatus features thereof are of general utility. The invention in its broader aspects is not limited to any single process, but is perfectly general in its application. For example, it may be used to facilitate the absorption of a gas in a liquid with chemical reaction, such as the absorption of $SO_3$ in sulfuric acid or in liquid alkali, the absorption of various acid anhydrides such as $SO_2$, oxides of nitrogen for the production of nitric acid or oxides of phosphorous for the production of phosphoric acid. It may also be used for simple absorption of a gas in a liquid without chemical reaction, such as the absorption of HCl in water or for gas washing in other processes than the one illustrated.

Similarly, the invention may be used for the condensation of vapors from a gas stream to form a liquid immiscible with the scrubbing liquid, as for example the removal of oil vapors from the burner gases in a sludge conversion process by means of water. It is also useful in the condensation of oil vapors in a body of oil as, for example, the separation of kerosene and gasoline as well as for the condensation of alcohol or other vapors in a liquid body of similar or dissimilar material.

It is believed that the mode of constructing and practicing my invention, and the many advantages thereof will be apparent from the foregoing detailed description. The live or seething gravel bed operates to break up or finely subdivide the gas bubbles, and distorts and acts upon these bubbles by reason of the formation of small openings and constrictions which are continually shifting and changing. The washboard action obtained is exceedingly thorough, and yet the operation is quiescent rather than turbulent. The gravel is self-cleaning and rids itself of all collected dust and dirt. The gravel is supported on a screen which itself need in no way impede or obstruct the gas flow upwardly or the precipitation of dirt downwardly. This elevated support of the gravel bed provides excellent gas circulation over the entire area of the perforated diaphragm. It permits the use of a bed of large area and small thickness so that the gas may be circulated under slight pressure. It permits the dirt shaken from the pebbles to be precipitated downwardly to the very bottom of the chamber out of the normal path of gas circulation; and finally, it provides room for the use of internal temperature controlling coils such as cooling coils or steam coils.

It will therefore be apparent that while I have shown and described the method and apparatus of my invention in preferred form, many changes and modifications may be made therein without departing from the spirit of the invention, defined in the following claims.

I claim:

1. Apparatus for bringing a liquid and a gas into intimate contact or mixture, as for absorption, scrubbing, or condensation, comprising an enclosed chamber having a perforated diaphragm intermediate the top and bottom of the chamber, a bed thereon of gravel or pebbles of quartz rock or other material not attacked by the gas and liquid, a body of the liquid partially filling the chamber and covering at least a portion of the bed of gravel, a gas inlet arranged to feed the gas into the chamber at a point below the aforesaid diaphragm, and means to adjust the liquid level in the chamber relative to the bed of gravel; the factors of specific gravity of the liquid, specific gravity of the pebbles, the gas velocity, and the liquid level being so interrelated and controlled as to cause a breaking up of the gas into a fine state of subdivision and an agitation or seething of the gravel or pebbles, but without causing turbulence or spray of liquid upwardly into the gas space in the chamber.

2. Apparatus for scrubbing a gas comprising a perforated support bearing a layer of gravel or pebbles at least partially immersed in a body of liquid, the liquid serving to lend buoyancy to the gravel, a gas inlet below the level of the liquid, and a gas outlet thereabove, whereby the resulting upward passage of the gas through the liquid and gravel causes agitation or shaking of the gravel, so that dust collected and trapped in the gravel is continually shaken therefrom and precipitated downwardly through the support to a place of collection located out of the normal path of gas circulation.

3. Apparatus for scrubbing a gas comprising an enclosed chamber having an elevated perforated diaphragm bearing a layer of gravel or pebbles at least partially immersed in a body of liquid, the liquid acting to lend buoyancy to the gravel, a gas inlet connected to the chamber just below the diaphragm, and a gas outlet connected to the chamber above the diaphragm, whereby the resulting upward passage of the gas through the liquid and gravel causes a slight or quiescent agitation, shaking, or seething of the gravel, so that dust collected and trapped in the gravel is continually shaken therefrom and precipitated downwardly through the diaphragm to the bottom of the chamber and out of the normal path of gas circulation.

4. Apparatus for bringing a liquid and a gas into intimate contact or mixture, comprising an enclosed chamber having a perforated diaphragm intermediate the top and bottom of the chamber, a layer thereon of gravel or pebbles of quartz rock or other material not attacked by the gas and liquid, a body of the liquid partially filling the chamber and covering at least a portion of the bed of gravel, a gas inlet arranged to feed the gas into the chamber at a point below the aforesaid diaphragm, and means to adjust the liquid level in the chamber relative to the bed of gravel; the factors of specific gravity of the liquid, specific gravity of the pebbles, the gas velocity, and the liquid level being so interrelated and controlled that the gas is sufficiently active to cause an agitation, shaking, or seething of the gravel or pebbles but insufficiently active to cause turbulence or spray of liquid upwardly into the gas space in the chamber, the resulting agitation or shimmy of the gravel providing a fine subdivision and distortion of and washboard action on the gas bubbles, and a self-cleaning action of the gravel by shaking therefrom any dust or dirt trapped thereby.

5. Apparatus for bringing a liquid and a gas into intimate contact or mixture, as for absorption, scrubbing, or condensation of the gas, comprising a cylindrical horizontal drum, a perforated diaphragm extending horizontally and approximately diametrically across the drum, a relatively shallow layer of gravel or pebbles of a material not attacked by the gas or liquid lying on top of said diaphragm, a body of liquid filling the lower portion of the drum and covering at least a portion of the gravel bed, one or more gas inlet pipes entering at the top of the drum and extending downwardly through the diaphragm in order to discharge the gas in the body of liquid below the diaphragm, one or more gas outlets connected to the upper portion of the drum, and means to variably adjust the liquid level in the drum relative to the bed of gravel.

6. Apparatus for bringing a liquid and a gas into intimate contact or mixture, as for absorption, scrubbing, or condensation of the gas, comprising a cylindrical horizontal drum, a perforated diaphragm extending horizontally and approximately diametrically across the drum, a relatively shallow layer of gravel or pebbles of a material not attacked by the gas or liquid lying on top of said diaphragm, a body of liquid filling the lower portion of the drum and covering at least a portion of the gravel bed, one or more gas inlet pipes entering at the top of the drum and extending downwardly through the diaphragm in order to discharge the gas in the body of liquid below the diaphragm, one or more gas outlets connected to the upper portion of the drum, and means to control the temperature of the liquid in the drum.

7. Apparatus for bringing a liquid and a gas into intimate contact or mixture, as for absorption, scrubbing, or condensation of the gas, comprising a cylindrical horizontal drum, a perforated diaphragm extending horizontally and approximately diametrically across the drum, a relatively shallow layer of quartz rock gravel or pebbles lying on top of said diaphragm, a body of liquid filling the lower portion of the drum and covering at least a portion of the gravel bed, one or more gas inlet pipes entering at the top of the drum and extending downwardly through the diaphragm in order to discharge the gas in the body of liquid below the diaphragm, one or more gas outlets connected to the upper portion of the drum, means to variably adjust the liquid level in the drum relative to the bed of gravel, and means to cool the liquid in the drum.

8. Apparatus for bringing a liquid and a gas into intimate contact or mixture, as for absorption, scrubbing, or condensation of the gas, comprising a cylindrical horizontal drum, a perforated diaphragm extending approximately diametrically across the drum, a relatively shallow layer of gravel or pebbles lying on top of said diaphragm, a body of liquid filling the lower portion of the drum and covering at least a portion of the gravel bed, one or more gas inlet pipes entering at the top of the drum and extending downwardly through the diaphragm in order to discharge the gas in the body of liquid below the diaphragm, one or more gas outlets connected to the upper portion of the drum, and means to control the temperature of the liquid in the drum including a plurality of coils located in the body of liquid below the diaphragm.

9. Apparatus for bringing a liquid and a gas into intimate contact or mixture, as for absorption, scrubbing, or condensation of the gas, comprising an enclosed chamber, a perforated diaphragm extending across the chamber, a layer of quartz gravel or pebbles lying on top of said diaphragm, said layer of gravel being approximately six inches thick, and the gravel being of quarter-inch size, a body of liquid filling the lower portion of the chamber and covering at least a portion of the gravel bed, a gas inlet pipe arranged to discharge the gas in the body of liquid below the diaphragm, and a gas outlet connected to the upper portion of the chamber.

10. Apparatus for bringing a liquid and a gas into intimate contact or mixture, as for absorption, scrubbing, or condensation of the gas, comprising a cylindrical horizontal drum, a perforated diaphragm extending approximately diametrically across the drum, a layer of gravel or pebbles lying on top of said diaphragm, said layer of gravel being approximately six inches thick, and the gravel being of quarter-inch size, a body of liquid filling the lower portion of the drum and covering at least a portion of the gravel bed, a gas inlet pipe arranged to discharge the gas in the body of liquid below the diaphragm, a gas outlet connected to the upper portion of the drum, means to determine the liquid level in the drum relative to the bed of gravel, and means to control the temperature of the liquid in the drum including a plurality of coils located in the body of liquid below the diaphragm.

11. The method of bringing a liquid and a gas into intimate contact or mixture by means of a layer of gravel or pebbles at least partially immersed in a body of liquid, which includes feeding the gas through the bed of gravel and so relating the buoyancy of the gravel and the gas velocity as to cause a slight and relatively quiescent agitation, shaking, or seething of the immersed gravel.

12. The method of scrubbing a gas by means of a layer of gravel or pebbles at least partially immersed in a body of liquid, which includes feeding the gas upwardly through the gravel from a point immediately below, thereby causing an agitation or shaking of the immersed gravel so that dirt collected and removed by the gravel is continually shaken therefrom, and permitting the thereby precipitated dirt to fall downwardly through the gravel and the liquid body to a place of collection located below and out of the normal upward path of gas circulation.

13. The method of bringing a liquid and a gas into intimate contact or mixture, by means of a layer of gravel or pebbles at least partially immersed in a body of the liquid, which includes feeding the gas through the bed of gravel and so relating the factors of specific gravity of the gravel, specific gravity of the liquid, the gas velocity, and the liquid level, as to cause an agitation or seething of the gravel or pebbles, a breaking up into a fine state of subdivision of the gas bubbles, and a retarded movement thereof through the gravel.

INGENUIN HECHENBLEIKNER.